(12) United States Patent
Zellner et al.

(10) Patent No.: US 7,621,458 B2
(45) Date of Patent: *Nov. 24, 2009

(54) MULTIPLE FUNCTION PORTABLE ELECTRONIC DEVICES

(75) Inventors: Samuel Zellner, Dunwoody, GA (US); Elizabeth Wagner, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/461,119

(22) Filed: Jul. 31, 2006

(65) Prior Publication Data

US 2006/0261174 A1 Nov. 23, 2006

Related U.S. Application Data

(63) Continuation of application No. 10/975,626, filed on Oct. 28, 2004, now Pat. No. 7,097,108.

(51) Int. Cl.
*G06K 19/06* (2006.01)
*G06K 5/00* (2006.01)

(52) U.S. Cl. .................... 235/492; 235/380

(58) Field of Classification Search .............. 235/375, 235/379, 380, 492; 705/1, 41
See application file for complete search history.

(56) References Cited

U.S. PATENT DOCUMENTS

| | | |
|---|---|---|
| 5,623,552 A | 4/1997 | Lane |
| 5,825,353 A | 10/1998 | Will |
| 5,884,271 A | 3/1999 | Pitroda |
| 5,955,961 A | 9/1999 | Wallerstein |
| RE38,137 E | 6/2003 | Wynn |
| 6,592,044 B1 | 7/2003 | Wong et al. |
| 6,609,654 B1 | 8/2003 | Anderson et al. |
| 6,732,919 B2 | 5/2004 | Macklin et al. |
| 6,925,439 B1 * | 8/2005 | Pitroda .................... 705/1 |
| 7,278,581 B2 * | 10/2007 | Ong ..................... 235/492 |
| 7,318,550 B2 * | 1/2008 | Bonalle et al. ........... 235/380 |
| 2003/0061157 A1 | 3/2003 | Hirka et al. |
| 2004/0117514 A1 | 6/2004 | Nelms et al. |
| 2005/0197165 A1 * | 9/2005 | Chen ..................... 455/566 |
| 2007/0145132 A1 * | 6/2007 | Minemura ............... 235/435 |

OTHER PUBLICATIONS

Baard, *Chameleon Card Changes Stripes*, Mar. 5, 2004 Wired News article, retrieved Aug. 24, 2004 from http://www.wired.com/news/business/0,1367,62545.00.html?tw=wn_tophead_6.

Brown et al., *Smallest PDA Gets Bigger Inside*, Feb. 6, 2001 PC Magazine review, retrieved Sep. 8, 2004 from http://www.pcmag.com/print_article/0,1761,a=4505.00.asp.

(Continued)

*Primary Examiner*—Thien M. Le
*Assistant Examiner*—April A Taylor
(74) *Attorney, Agent, or Firm*—Myers Bigel Sibley & Sajovec, P.A.

(57) ABSTRACT

Portable electronic devices include a unitary package including first and second opposing faces. A first flat panel display is provided on the first face. A user input device also is provided on the unitary package. A processor is provided in the unitary package that is configured to control the first and second flat panel displays, in response to the user input device.

21 Claims, 4 Drawing Sheets

OTHER PUBLICATIONS

*Chameleon Network: The Pocket Vault*, retrieved Sep. 10, 2004 from http://www.chameleonnetwork.com, copyright 2004.

Engadget Staff, *engadget, The Chameleon Card*, Mar. 5, 2004 article, retrieved Aug. 24, 2004 from http://www.engadget.com/entry/8277407852884839, copyright 2004.

Fried, *Intel Tells Rex to Play Dead*, Aug. 21, 2001 CNET News.com article, retrieved Sep. 8, 2004 from http://news.com.com/2102-1040_3-271945.html?tag=st.util.print.

*PrivaSys—Technology Innovation: Core Technologies*, retrieved Aug. 24, 2004 from http://www.privasys.com, copyright 1999-2003.

*PrivaSys Product Information*, retrieved Aug. 27, 2004 from http://www.privasys.com, copyright 1999-2003.

*The Franklin, Generation 'Rex' Pages*, retrieved Sep. 8, 2004 from http://www.geocities.com/Hollywood/Guild/7470/rex.html.

*Xircom Rex 5001—(Rex Pro) Micro PDA*, retrieved Sep. 8, 2004 from http://www.marionmeyer.com/rex.htm.

\* cited by examiner

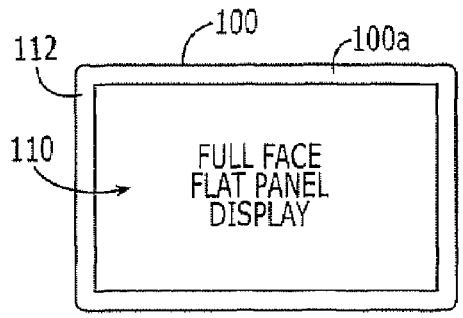
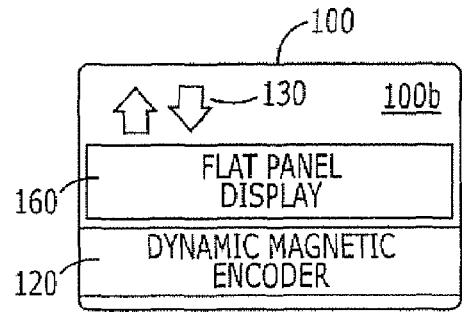
FIG. 1A
FIG. 1B
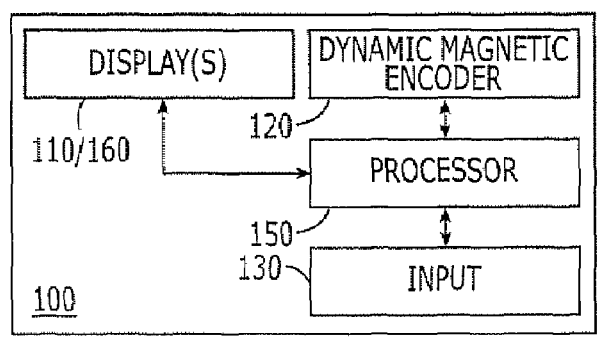
FIG. 1C
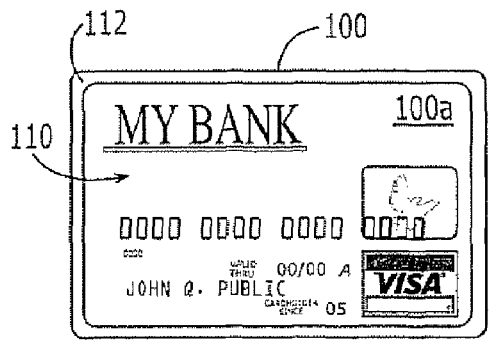
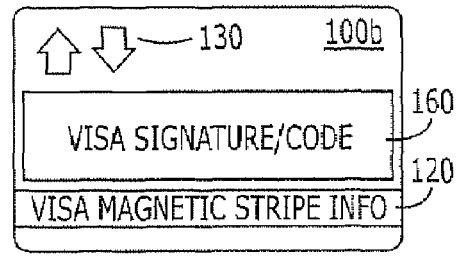
FIG. 2A
FIG. 2B
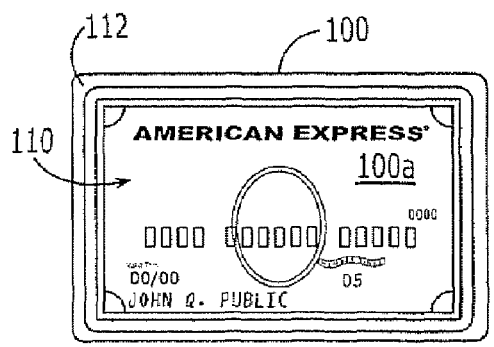
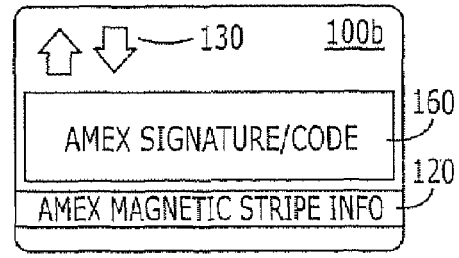
FIG. 3A
FIG. 3B

MULTIPLE FUNCTION PORTABLE ELECTRONIC DEVICES

CROSS REFERENCE TO RELATED APPLICATION

This application is a continuation of application Ser. No. 10/975,626, filed Oct. 28, 2004, entitled Multiple Function Electronic Cards, now U.S. Pat. No. 7,097,108, the disclosure of which is hereby incorporated herein by reference in its entirety as if set forth fully herein.

FIELD OF THE INVENTION

This invention relates to credit cards and related cards, such as debit cards, "club" cards and other personal membership type cards, and more particularly to electronic credit cards and other related electronic cards.

BACKGROUND OF THE INVENTION

Credit cards have become ubiquitous in consumer transactions. As is well known to those having skill in the art, a credit card employs a package, generally plastic, having standardized vertical and horizontal dimensions such as, for example, about 2⅛" by about 3⅜", and including first and second opposing faces. One face generally includes a logo, credit card number, expiration date and/or other indicia. The second face may include a signature block and a magnetic stripe.

Many individuals have a large number of credit cards that they carry in their wallet or purse. Unfortunately, given the limited size of the wallet or purse, it may be impractical for individuals to carry all of their credit cards. To eliminate some of the bulk, many companies have created keychain versions of their credit cards. However, the user of these credit cards may then carry a plethora of keychain credit cards, especially "club" cards, on a keychain along with their keys, so that there still may be limits on an individual's capacity to carry credit cards.

Electronic credit cards also have been proposed in an attempt to replace one or more conventional credit cards. See, for example, U.S. Pat. Nos. 5,825,353; 6,609,654; 6,732,919 and RE38,137, as well as U.S. Patent Application Publications US 2003/0061157 and US 2004/0117514. Attempts have been made to market electronic credit cards, as described, for example, at the websites PrivaSys.com and chameleonetwork.com. Finally, Xircom has marketed the REX line of micro Personal Digital Assistants (PDA), which provide a credit card-sized PDA.

SUMMARY OF THE INVENTION

Portable electronic devices according to exemplary embodiments of the present invention include a package including first and second opposing faces. A flat panel display is provided on the first face. A user input device also is provided on the package. A processor is provided in the package that is configured to display a substantially full size image of a front of a predetermined card (credit card, debit card, club card and/or personal membership card) on the flat panel display, and to also display a user signature, a card code and/or a card issuer telephone number for the predetermined card on the flat panel display, in response to user selection of the predetermined card via the user input device. Accordingly, a substantially full size image of a predetermined card is displayed on a portable electronic device, such as a PDA. The full size card image may be used in electronic commerce applications.

Other embodiments of the present invention may include a dynamic magnetic encoder on the second face. The processor may be further configured to control the dynamic magnetic encoder to provide magnetic stripe information for the predetermined card, in response to user selection of the card.

Other embodiments of the present invention can also configure the processor to display a substantially full size image of a Social Security card, a driver's license, an employee identification card, a frequent buyer card, a medical identification card, a membership card and/or an insurance identification card, in response to user selection via the user input device. Some of these images may be displayed in conjunction with magnetic stripe information that is provided on the dynamic magnetic encoder. Other images may be provided without accompanying magnetic stripe information. In other embodiments, the processor is configured to display an image of a coupon, a receipt, a map, a Web page, a financial statement and/or a personal photograph in response to user selection via the user input device. Moreover, in yet other embodiments, the processor may be further configured to execute a security, financial, Web browser, video, data processing, data synchronization, computer personalization, electronic key, electronic cash (eCash) shopping and/or subscriber identification application, in response to user selection via the user input device.

Other embodiments of the present invention can add additional components to the portable electronic device. A radio frequency identification (RFID) reader, an RFID transmitter, a short range wireless transceiver (such as Bluetooth, ultra-wideband, 802.xx), a long range wireless transceiver (such as a cellular, radio and/or television transceiver), a bar code reader, a bar code display, a location system, an electrical contact, and/or a biometric reader may be added in and/or on the package. A separate Subscriber Interface Module (SIM) card or other portable memory card (such as a micro hard drive or solid state memory) also may be coupled to, or housed in, the portable electronic device. A power source, such as a battery, fuel cell and/or photocell also may be provided. In some embodiments, a biometric reader is provided on the package and the processor is configured to display the substantially full face image of a predetermined card on the flat panel display and/or to control the dynamic magnetic encoder to provide magnetic stripe information for the predetermined card, in response to user selection of the predetermined card via the user input device, and verification of a user identity via the biometric reader.

Still other embodiments of the present invention may provide one or more user input devices, such as one or more soft keys that are incorporated into the flat panel display, a keypad, a full keyboard, a voice recognition system, a biometric recognition system, and/or other user input device. A portable electronic device according to some embodiments of the present invention may also be combined with a wallet that protects the portable electronic device and may also provide functionality to interact with the portable electronic device.

Other embodiments of the present invention can provide a portable electronic device including a unitary package having first and second opposing faces. A first flat panel display is provided on the first face and a second flat panel display is provided on the second face. In some embodiments, a processor is configured to control the first and second flat panel displays in response to a user input device. In these embodiments, the processor can also be configured to display a substantially full size image of a front of a predetermined card on the first front panel display and to display an image of a back face of the predetermined card on the second flat panel display, in response to user selection of the predetermined card via the user input device. In other embodiments, a user signature, a card code and/or a card issuer telephone number for the predetermined card may be displayed on the second flat panel display in response to the user selection of the predetermined card via the user input device.

In still other embodiments of the present invention, a radio frequency system is provided in the package, and the processor is further configured to interface with a server using the radio frequency system, to provision, deactivate, renew and/or upgrade the predetermined card. In some embodiments, the processor is further configured to receive a file comprising the substantially full size image of the predetermined card from the server, wherein the file also includes an account and/or an authentication key. In other embodiments, two or more separate files may be received. A server that is configured to interface with portable electronic devices according to the above embodiments also may be provided according to other embodiments of the present invention.

In still other embodiments, the processor is further configured to prevent use of at least one card, prevent predetermined display content and/or prevent execution of at least one predetermined application in the portable electronic device, in response to instructions from an issuer of the card. A "walled garden" of cards, other images and/or applications thereby may be provided by the card issuer. In still other embodiments, the processor is further configured to control information exchange in response to user selection of the predetermined card via the user input device. Accordingly, the selection of a predetermined card can cause the portable electronic device to share the card or other card information with a purchasing system that is requesting card information, through a radio, magnetic and/or other interface.

Other systems, methods, and/or computer program products will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIGS. 1A and 1B illustrate first and second faces of an electronic card according to various embodiments of the present invention.

FIG. 1C is a block diagram of an electronic card of FIGS. 1A and 1B.

FIGS. 2A and 2B illustrate first and second faces of an electronic card according to other embodiments of the present invention.

FIGS. 3A and 3B illustrate first and second faces of an electronic card according to still other embodiments of the present invention.

DETAILED DESCRIPTION

Figure 4:
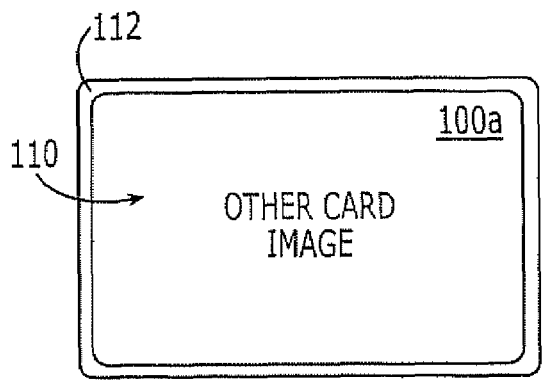
FIGS. 4 and 5 illustrate first faces of electronic cards according to yet other embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element. Thus, a first face discussed below could be termed a second face without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams of methods, systems, cards and computer program products according to embodiments of the invention. It will be understood that a block of the block diagrams, and combinations of blocks in the block diagrams, may be implemented at least in part by computer program instructions. These computer program instructions may be provided to a processor in an electronic card, such that the instructions, which execute via the processor create means, modules, devices or methods for implementing the functions/acts specified in the block diagram block or blocks.

These computer program instructions may also be stored in a memory on the card that can direct a processor of a card to function in a particular manner, such that the instructions stored in the memory produce an article of manufacture including computer-readable program code which implements the functions/acts specified in block diagram block or blocks. The computer program instructions may also be loaded onto a processor of a card to cause a series of operational steps to be performed by the card to produce a computer implemented process such that the instructions which execute on the processor provide steps for implementing the functions/acts specified in the block diagram block or blocks.

FIGS. 1A and 1B illustrate first and second faces of an electronic card, and FIG. 1C is a block diagram of an electronic card, according to various embodiments of the present invention. Referring now to FIGS. 1A and 1B, an electronic card according to some embodiments of the present invention includes a package 100 having vertical and horizontal dimensions of a standard credit card, i.e., about 2⅛" by about 3⅜". In some embodiments, the package 100 may be thicker than a standard plastic credit card and, in some embodiments, may be up to about ¼" or more thick. The package 100 includes first and second opposing faces shown in FIGS. 1A and 1B, respectively. A flat panel display 110 extends over substantially the first face. The flat panel display 100 that extends over substantially the first face may also be referred to herein as a full face flat panel display 110. In some embodiments, the flat panel display 110 may extend over the entire first face. However, in other embodiments, a frame region 112 may surround the flat panel display. In some embodiments, a full face flat panel display extends over at least about 50% of the first face.

As shown in FIG. 1B, the second face 100b includes a dynamic magnetic encoder 120 thereon. Dynamic magnetic encoders are well known to those having skill in the art, and may be used to provide variable magnetic stripe information that can emulate a conventional magnetic stripe of a conventional credit card. As also shown in FIG. 1B, a user input device 130 is provided on the package 100. In FIG. 1B, the user input device 130 is embodied by a pair of discrete up and down keys provided on the second face 100b. In other embodiments, however, the user input device 130 may include one or more soft keys that are displayed on the full face flat panel display 110, a keypad and/or keyboard that is provided on the first and/or second faces, a voice recognition system and/or other conventional user input device(s).

In some embodiments of the present invention, the flat panel display 110 is a first flat panel display 110, and a second flat panel display 160 is provided on the second face 100b. The second flat panel display 160 may or may not be a full face flat panel display. The flat panel display may include one or more of the soft keys 130 therein.

As shown in FIG. 1C, a processor 150 also is provided in the package 100. The processor may be embodied as a microprocessor, custom processor, controller, Application Specification Integrated Circuit (ASIC) and/or other conventional general purpose and/or custom microelectronic processor that includes onboard and/or external memory. In some embodiments of the invention, the processor 150 is configured to display a substantially full size image of a predetermined credit card on the first full face flat panel display 110, to display an image of a back face of the predetermined credit card on the second flat panel display 160, and to control the dynamic magnetic encoder 120 to provide magnetic stripe information for the predetermined credit card, in response to user selection of the predetermined credit card via the user input device 130. In some embodiments, a substantially full size image is at least about 50% of a full size image on a plastic credit card. In other embodiments of the present invention, the processor is also configured to display an image of a back face of the predetermined credit card on the second flat panel display 160, in response to user selection of the predetermined credit card via the user input device 130. It also will be understood that a power source (battery, fuel cell, photocell, etc.) also is provided in the package 100.

For example, as shown in FIGS. 2A and 2B, an image of a VISA® card may be displayed on the full face flat panel display 110, and VISA magnetic stripe information may be provided by the dynamic magnetic encoder 120, in response to user selection at the user input device 130. Moreover, a user signature, a VISA card code and/or a VISA card issuer telephone number may be displayed on the second flat panel display 160 for the VISA card, in response to user selection at the user input device 130. In FIGS. 3A and 3B, an American Express® credit card image may be displayed on the full face flat panel display 110, while American Express magnetic stripe information may be provided by the dynamic magnetic encoder 120, and an American Express back face image, including a user signature, an American Express card code and/or an American Express card issuer telephone number may be displayed on the second flat panel display 160. It will be understood that the front and/or back images of the credit card need not conform identically to a conventional plastic credit card, but should conform substantially enough such that the electronic consumer card 100 may be used in place of a conventional credit card for consumer transactions where a clerk and/or a machine views the images of the credit card. It also will be understood that, in other embodiments, the back face 100b may include a conventional signature line and the second flat panel display may display the credit card code and/or issuer telephone number, or may be omitted.

Accordingly, as shown in FIGS. 1A-3B, the user input device 130 may be used to scroll through a plurality of credit card images (including, for example, credit card, debit card and/or check cashing cards that are issued by the same credit card issuer), while the dynamic magnetic encoder 120 provides the appropriate magnetic stripe information. The electronic card of FIGS. 1A-3B may thereby take the place of a large number of credit cards for manual credit card transactions (where a clerk or other individual obtains credit card information from the image of the credit card) and for automated credit card transactions (where the image of the credit card and/or magnetic stripe information is used to obtain credit card information by a card reader).

FIG. 4 illustrates other embodiments of the present invention. In these embodiments, other substantially full size card images may be displayed on the full face flat panel display 110 on the first face 100a of the package 112. These other substantially full size card images that are displayed can include a Social Security card, a driver's license, an employee identification card, a frequent buyer card, a medical identification card, a membership card, an insurance identification card and/or other conventional credit card-sized cards that may be carried in a wallet or purse. These cards may be scrolled through using the user input device 130. The dynamic magnetic encoder 120 may be used with selected card images, but may not be used with other card images.

Figure 5:
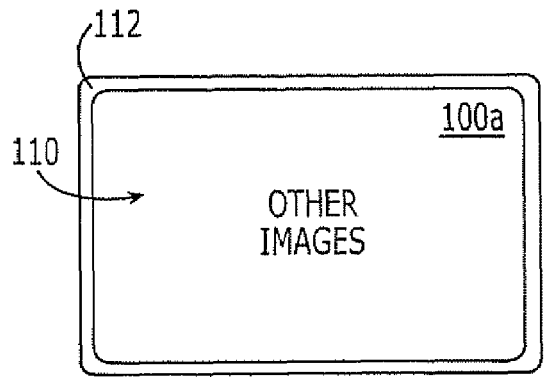

Moreover, FIG. 5 illustrates that other images that are not conventionally found on credit cards may also be displayed on the full face flat panel display 110. For example, a store coupon, a receipt, a map, a Web page, a financial statement (such as an account balance), personal photographs and/or other images may be displayed. These images need not be substantially full size, and the dynamic magnetic encoder may or may not be used in conjunction with these images.

It will be understood by those having skill in the art that, as the number of images that can be displayed on the flat panel displays 110 and/or 160 increases, the user input device 130 may provide more sophisticated scrolling than simple sequential up-down scrolling. Thus, in some embodiments, a conventional menu and scroll bar may be displayed on the flat panel displays 110 and/or 160, to allow efficient accessing of credit cards and other card images. Hierarchical menus may be provided, using groupings of related images, such as related credit, debit and check cashing cards. Alternatively, separate keys may be provided for various groups of images. In other embodiments, various touch-screen areas may be provided on the flat panel displays 110 and/or 160, to allow user access to the credit card images (FIGS. 2A-3B), the other card images (FIG. 4) and/or the other images (FIG. 5). Scrolling techniques are conventionally used with personal computers, personal digital assistants, smart phones, and other electronic devices, and need not be described in further detail herein.

Embodiments of FIGS. 1-5 can also provide methods of using electronic cards according to various embodiments of the present invention. The electronic cards include a package 100 having vertical and horizontal dimensions of a standard credit card and including first and second opposing faces, a flat panel display 110 extending over substantially the first face, a dynamic magnetic encoder 120 on the second face and a user input device 130 on the package. These methods include sequentially selecting a predetermined credit card via the user input device 130 and displaying a substantially full size image of a predetermined credit card on the flat panel display 110, while simultaneously providing magnetic stripe information for the predetermined credit card on the dynamic magnetic encoder 120, in response to the sequential selection. Other card images and other non-card images also may be displayed. Back of card images also may be displayed on the second flat panel display 160.

Figure 6:
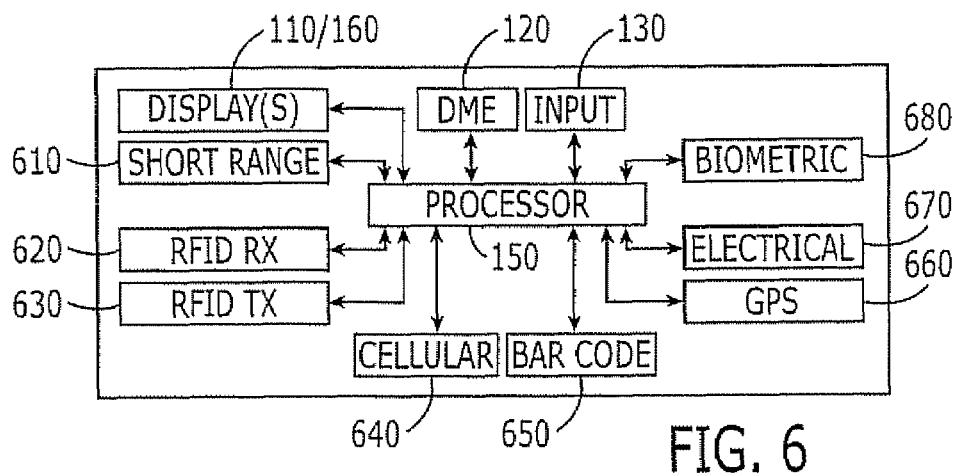
FIGS. 6-9 are block diagrams of electronic cards according to various embodiments of the present invention.

FIG. 6 is a block diagram of electronic cards according to other embodiments of the invention. As shown in FIG. 6, in addition to the full face flat panel display(s) 110/160, Dynamic Magnetic Encoder (DME) 120, input device 130, processor 150 and power supply of FIG. 1C, additional components also may be provided in and/or on the card, including a short range wireless transmitter/receiver (transceiver) 610, such as a Bluetooth, Wi-Fi and/or other short range radio transceiver, a Radio Frequency ID (RFID) receiver 620, an REID transmitter 630, a cellular transceiver 640 (including conventional cellular, PCS, wideband cellular, and/or other conventional cellular device), a bar code reader 650, a location system 660, such as a GPS system, an electrical contact 670, such an electrical contact that is used in conventional "smart cards" or a Universal Serial Bus (USB) connector, and/or a biometric device 680, such as a fingerprint reader. The biometric device 680 may only allow access to a particular credit card, function and/or application, upon verification of a user identity via the biometric device 680. The design and operation of the individual devices 610-680 are well known to those having skill in the art, and need not be described further herein.

Figure 7:
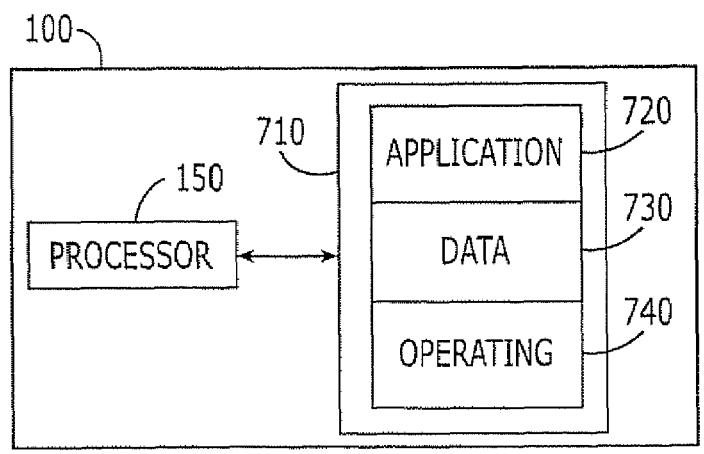

FIG. 7 is a block diagram of other embodiments of the present invention. As shown in FIG. 7, the processor 150 interfaces with one or more volatile and/or non-volatile memory devices 710 that may be separate from and/or integrated with the processor 150. An operating system 740, data 730 and one or more applications 720 are stored in the memory device(s) 710. As will be appreciated by those of skill in the art, the operating system 740 may be any operating system suitable for use with the processor 150. The application programs 720 are illustrative of the programs that can implement the various features of the card 100 and generally include at least one application that supports operations according to embodiments of the present invention. Finally, the data 730 represents the static and dynamic data used by the application programs 720, the operating system 740 and/or other software programs that may reside in the memory device(s) 710.

Accordingly, the processor 150 may operate as a general purpose processor, and may execute one or more applications 720 on the card, in a standalone mode and/or interfacing with external devices. These applications can include security, financial, Web browser, video, data processing, data synchronization, computer personalization, electronic key, electronic cash (eCash) shopping, currency converter, money management, subscriber identification and/or other applications, in response to user selection via the user input device 130. Security, financial, Web browser, video, data processing, shopping and electronic key applications are well known to those having skill in the art and need not be described further herein. As used herein, data synchronization applications refer to synchronization of the data 730 on the electronic card 100 with data on another computer, as is conventionally performed with laptop computers and PDA devices, and need not be described further herein. Computer personalization refers to transporting of the look, feel and/or function of one's personalized computer preferences across multiple host computers, including appearance, settings, programs and user data, as described, for example, in U.S. Patent Application Publication US 2004/0095382 to Fisher et al. Finally, as used herein, subscriber identification relates to subscriber information that is stored, for example, in Subscriber Identification Modules (SIM) that are conventionally used with GSM cellular telephones and other devices.

Other electronic commerce applications may be provided on the electronic card 100, as described for example in Ford et al., *Secure Electronic Commerce: Building the Infrastructure for Digital Signatures and Encryption*, Prentice Hall, 1997 and Radu, *Implementing Electronic Card Payment Systems* (*Artech House Computer Security Series*), Artech House Publishers, 2002, the disclosures of both of which are hereby incorporated herein by reference in their entirety as if set forth fully herein. Content may be stored on the card using XML, XHTML, WAP (WML) and/or any other conventional markup languages. Applications may be integrated on the card using .NET applications, and may be provided to the card using Really Simple Syndication (RSS) information feed structures. Other conventional systems for providing content, storing content and/or integrating applications may be used.

Figure 8:
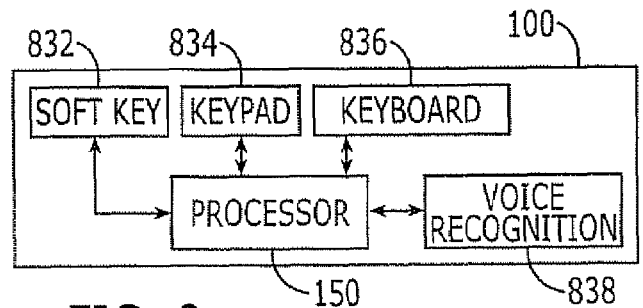

FIG. 8 is a block diagram of electronic consumer cards according to various embodiments of the present invention that employ various user input devices in addition to, or instead of, the user input device 130. In particular, as shown in FIG. 8, the processor 150 may interface with one or more soft keys 832 that may be provided on the flat panel displays 110/160, or separate therefrom, a keypad 834, such as a conventional telephone keypad, a keyboard 836, such as a full function Qwerty keyboard, and/or a voice recognition system 838. The design of these individual input devices are well known to those having skill in the art, and need not be described further herein.

It will be understood by those having skill in the art that embodiments of FIGS. 1-8 may be combined in various combinations and subcombinations, with or without flat panel displays 110/160. For example, credit card imaging and dynamic magnetic encoding of FIGS. 1A-3B may be combined with other card imaging of FIG. 4 and/or other images of FIG. 5. Moreover, the various other devices of FIG. 6 may be combined with any of the embodiments of FIGS. 1A-5. Application processing of FIG. 7 also may be combined with the devices of FIG. 6 and/or any of the image displays of FIGS. 1A-5. Also, the various input devices of FIG. 8 may be used in any of the embodiments of FIGS. 1A-7.

In other embodiments of the present invention, the full face flat panel display 110 need not display the substantially full size credit card image, but, rather, can display an icon or other smaller representation of a credit card. Thus, referring again to FIGS. 1A-1C, electronic cards according to other embodiments of the present invention include the package 100 having vertical and horizontal dimensions of a standard credit card, a full face flat panel display 110 extending over substantially the first face 100a, a dynamic magnetic encoder 120 on the second face, a user input device 130, and a processor 150 in the package, wherein the processor 150 is configured to control the flat panel display 110, the dynamic magnetic encoder 120 and the user input device 130. Electronic cards thereby may be provided that can substitute for a plurality of conventional credit cards, but that need not display the full size image of the predetermined credit card on the flat panel display 110 during use. Other non-credit card applications that use the full face flat panel display 110 and the dynamic magnetic encoder 130 thereby may be provided. A second flat panel display 160 also may be provided in some embodiments.

Figure 9:
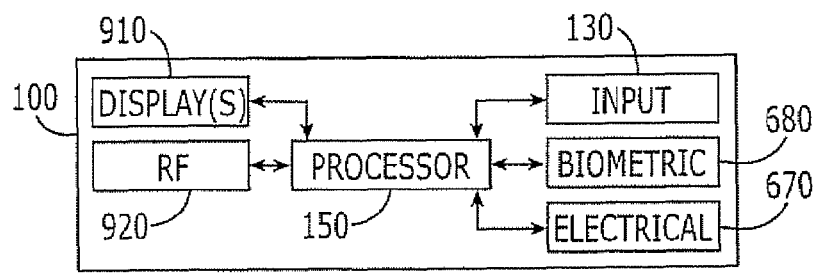

FIG. 9 is a block diagram of other electronic cards according to various embodiments of the present invention. As shown in FIG. 9, these embodiments include the package 100 having vertical and horizontal dimensions of a standard credit card and including opposing faces. One or more displays 910 are provided, which need not be full face flat panel displays, but, rather, can be small area displays. The user input device 130, a biometric device 680, an electrical connector 670, a processor 150 and a power source are provided, as was described above. Moreover, an RF subsystem 920 also is provided that includes a short range RF system 610, an RFID receiver 620, an RFID transmitter 630, a cellular system 640 and/or a position (GPS) system 660. The processor 150 controls these other elements. It has been found, according to some embodiments of the present invention, that the provision of a display 910, a user input device 130, an RF system 920, an electrical contact 670 and a biometric device 680 in the form factor of a credit card, and under control of a processor 150, may be particularly useful for many different applications.

Figure 10:
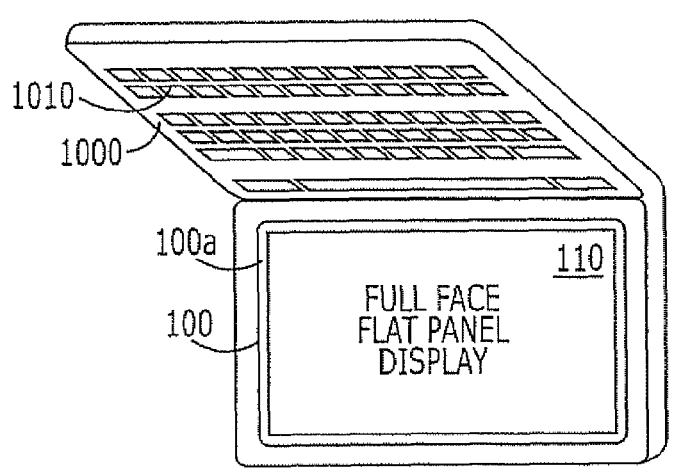
FIG. 10 illustrates an electronic card according to various embodiments of the present invention, coupled to a wallet according to various embodiments of the present invention.

FIG. 10 is a perspective view of other embodiments of the present invention. In these embodiments, the electronic card 100 is removably or fixedly coupled to a wallet 1000. The wallet may be a conventional leather or plastic wallet that includes a slot for holding the electronic card 100, and may also include conventional slots for other credit cards, money, photographs, etc. In other embodiments, as shown in FIG. 10, the wallet 1000 may also include one or more electronic components such as a keypad 1010, and a system for coupling these electronic components to the electronic card 100 using, for example, the RF system 920 and/or the electrical contact 670, on the electronic card 100. The wallet 1000 may include a keyboard, an additional processor, memory devices including solid state, optical and/or magnetic memory devices, an RF system, a keypad and/or other conventional input/output devices. These devices may provide additional functionality when interacting with the electronic card 100.

Figure 11:
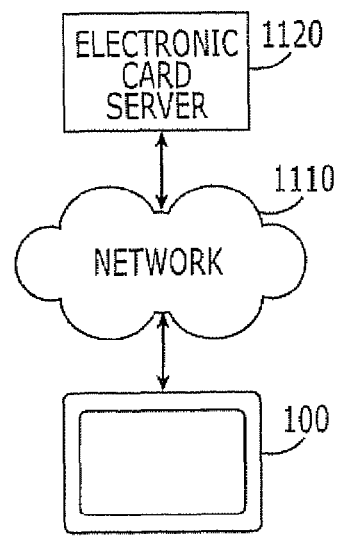
FIG. 11 is a block diagram of an electronic card according to various embodiments of the present invention that interfaces with at least one electronic card server according to various embodiments of the present invention.

FIG. 11 is a block diagram of electronic cards 100 according to various embodiments of the present invention that are configured to interface with an electronic card server 1120 via a network 1110. The electronic card 100 may interface with the electronic card server 1120 directly or via the network 1110 using a wireless interface that is provided, for example, by the radio frequency system 610, 640 and/or 920. The electronic card server 1120 may employ one or more enterprise, application, personal, pervasive and/or embedded computer systems that are connected via a wireless and/or wired, private and/or public network, including the Internet. Multiple electronic card servers 1120 may be provided. In some embodiments, each card issuer may provide a separate electronic card server 1120. Moreover, the network 1110 may include one or more wired and/or wireless, private and/or public network, including the Internet.

Still referring to FIG. 11, the electronic card server 1120 may be configured to interface with the processor 150, to provision, deactivate, renew and/or upgrade one or more of the credit cards. Moreover, in some embodiments, the server 1120 is configured to send, and the processor 150 is configured to receive, a file comprising the substantially full size image of the predetermined credit card server 1120. The file also may include an account code and/or an authentication key.

Accordingly, embodiments of FIG. 11 can provide an option to renew or upgrade a credit limit of a credit card after it expires, rather than by mail. In other embodiments, however, cards may expire on their own based on their expiration date, and expired cards may not be displayed on the display(s) of the electronic card. Moreover, embodiments of FIG. 11 can allow the server 1120 to terminate one or all card images remotely, for example upon notification that the electronic card 100 is stolen. Embodiments of FIG. 11 can also be used to download new card images. In some embodiments, the image file may also include an account code and/or an authentication key. However, in other embodiments, the card image file can include a generic card image file, and separate files may include the credit card number, expiration date, account code, an authentication key and/or other images and/or data for a user's card.

In still other embodiments of FIG. 11, the server 1120 can instruct the processor to prevent use of at least one credit card, prevent predetermined display content and/or prevent execution of at least one predetermined application in the electronic card 100, in response to instructions from an issuer of the electronic card. Thus, a "walled garden" of various complimentary credit cards, images, applications, etc., may be provided and controlled by the issuer of the electronic card 100. Competitive credit cards, images and/or applications may be prohibited, whereas complimentary credit cards, images and/or applications may be allowed in the "walled garden".

Figure 12:
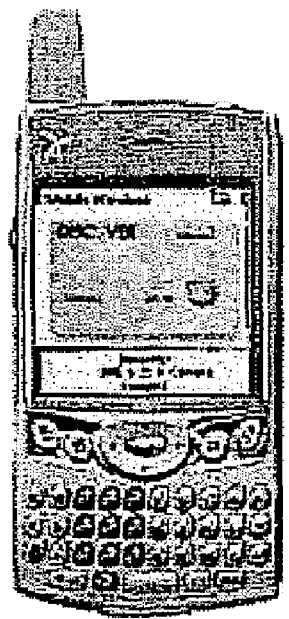
FIG. 12 illustrates a personal digital assistant including a full size credit card image according to various embodiments of the present invention.

In yet other embodiments of the present invention, a portable package may be configured to display a full size image of a credit card and/or other cards that were described above, wherein the package has vertical and horizontal dimensions that are larger than a standard credit card. For example, as shown in FIG. 12, a PDA may be configured to display on the display thereof a full size image of a credit card or other card. By displaying a full size image of a credit card or other card on a PDA, cell phone or other portable electronic device, additional electronic commerce capabilities may be provided. Moreover, embodiments of FIG. 12 may be combined with any or all of the embodiments that were described above.

Additional discussion of various embodiments of the present invention now will be provided. Electronic cards according to various embodiments of the present invention can interface with credit card readers that are presently used, so that an individual can carry only one card. The electronic nature of this card can allow the user to add, edit and delete cards, as desired. Additional features of the electronic card may include the ability to display the various card types, keep track of purchases, incorporate additional forms of security, location tracking, communicate with applications for down-loading data and backup, and business and consumer applications, such as budgeting, games, videos, music, information, coupons and/or email.

Various types of content may be stored in an electronic card according to various embodiments of the present invention. The content can include credit cards, store cards, including frequent shopper cards that can include tallies of total savings, points and purchases, advertisements and/or coupons that can be linked to a loyalty program, receipts, personal information management data, maps and/or Web pages, other applications, such as bank balance, health check, calorie counter, medical records and information, health information and/or military history. Graphical user interfaces can include a display, a touch screen, a voice recognition system, a speaker, and a video player. Interfaces may be provided using a programmable magnetic stripe, RFID, bar code reader and display capability, radio (cellular, Wi-Fi, Bluetooth, ultra wideband, television) and/or electrical contacts.

Various security applications may be provided including biometrics, encryption of data on the card, pin codes, voice recognition, auto locking timeouts, and/or remote locking and deleting. Other capabilities may be provided on the card, including location capabilities and the ability to provide multiple profiles, such as an individual profile or a group profile, so that the card may be used as an individual and as an employee, for example. General purpose personal computer functionality also may be provided, as well as a browser, synchronization capabilities with a personal computer or personal digital assistant, and voice, data, image and/or video capabilities.

The dynamic magnetic encoder that may be present in some embodiments of the present invention can allow the card to be compatible with existing card readers. Moreover, future card readers may include a radio frequency interface for the card that is capable of loading information on the card. This information can include receipts, current buyer points, savings, advertisements, coupons and/or store information (such as location, hours, telephone numbers, email addresses, Web sites and/or store applications).

Other embodiments can provide conventional Subscriber Information Module (SIM) card capabilities and/or other type of plug-in memory/identity/security card capability. Thus, in some embodiments, the electronic card may include a smaller SIM card removably housed therein. The SIM card may take the form of a card that is smaller than the vertical and horizontal dimensions of a standard credit card and may be plugged into or inserted into a slot or space in the electronic card. Thus, a smaller SIM card may be removably housed in an electronic card, according to some embodiments of the present invention. Other portable memory cards, such as micro hard drives and/or solid state memory, also may be housed in an electronic card.

Financial applications may also be provided, including bank account details, such as balance and/or currency exchange applications. Antivirus software, personal photo displays and/or electronic keys also may be provided. A keyboard may be provided for entering data using a flip-down portion of the card and/or in a wallet. Moreover, the wallet can provide protection for the card, power, keyboard, radio connectivity and additional memory. The wallet may be covered in leather to provide the look and feel of a regular wallet, and can have the ability to store paper/plastic cards and paper money.

Other embodiments of an electronic card can include a shopping agent in the electronic card that can provide a search capability for the best price using an RFID reader in the electronic card that allows the user to query a product in a store automatically. Moreover, this application can allow a search to be performed on items to be purchased to identify electronic coupons, by signaling to the coupon distributor (which could be the store merchant), that the holder of the card is in the store, so that it may be desirable to issue an electronic coupon. Additional searching may be performed for product information, purchasing guides, and/or satisfaction surveys, such as may be found on the Web. Searching may also be performed for compatibility verification, for example, to determine whether batteries are appropriate for the user's camera. Applications also may be provided to control purchasing, for example, so that child-safe electronic cards are implemented which can prevent purchasing of certain articles by children.

Moreover, if an electronic card according to embodiments of the present invention is sponsored or provided to a user by a particular entity, such as a particular credit card issuer, applications on the card may provide a "walled garden" of cards, images and/or applications that are sponsored by the card issuer. Thus, for example, if a particular card issuer issues the card, the card issuer may allow an image of the card issuer's credit card to be displayed, and the card issuer's credit card to be used, along with images of Social Security cards, driver's license and/or other non-competitive cards, but may prohibit competitive credit cards from being loaded on the electronic card. Thus, the service provider that provides the card may control the applications, cards and/or data that are used with the service provider's card. However, in other embodiments, an unrestricted number and/or type of card may be used in the electronic card.

Programmable skins also may be provided by the full face flat panel display of an electronic card, according to some embodiments of the present invention. Since a large part of the card is taken up by the display, users can design their own displays or graphical user interfaces when a credit card is not being displayed. Similar to a screen saver on a personal computer, the style of the menu and the background or motif of the menu may be personalized by the user, so that when the card is not in use, a user's personal design is displayed. Moreover, in other embodiments, different motifs may be provided on the credit card, such as a flag, a picture, a sports team affiliation, etc., as is commonly provided on plastic credit cards. A picture of the user also may be provided in some embodiments.

Moreover, some embodiments of the present invention can define various groups to which the user of the card belongs. Multiple groups may be defined along with governance rules for each group. These groups may encompass, for example, a family and a work organization. Governance may provide the ability to have a group owner with access to editing capabilities for the group, and group members with waterfalls of editing capabilities.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A portable electronic device comprising:
   a unitary package including first and second opposing faces;
   a first flat panel display on the first face;
   a second flat panel display on the second face;
   a user input device on the unitary package;
   a processor in the unitary package that is configured to control the first and second flat panel displays and that is responsive to the user input device; and
   a dynamic magnetic encoder on the second face.

2. A portable electronic device according to claim 1 wherein the processor is further configured to display a substantially full size image of a Social Security card, a driver's license, an employee identification card, a frequent buyer card, a medical identification card and/or an insurance identification card in response to user selection via the user input device.

3. A portable electronic device according to claim 1 wherein the processor is further configured to display an image of a coupon, a receipt, a map, a Web page, a financial statement and/or a personal photograph, in response to user selection via the user input device.

4. A portable electronic device according to claim 1 wherein the processor is further configured to execute a security, financial, Web browser, video, data processing, synchronization, computer personalization, electronic key, shopping and/or subscriber identification application, in response to user selection via the user input device.

5. A portable electronic device according to claim 1 further comprising a radio frequency identification (RFID) reader, an RFID transmitter, a short range wireless transceiver, a cellular transceiver, a bar code display, a location system and/or an electrical contact in and/or on the package.

6. A portable electronic device according to claim 1 wherein the user input device comprises a soft key that is incorporated into the first or second flat panel display, a keypad on the package, a keyboard on the package and/or a voice recognition system.

7. A portable electronic device according to claim 1 in combination with a wallet that is configured to hold the portable electronic device and to interact therewith.

8. A portable electronic device according to claim 1 wherein the processor is configured to display a representation of a predetermined card on the first flat panel display and to control the dynamic magnetic encoder to provide magnetic stripe information for the predetermined card, in response to user selection of the predetermined card via the user input device.

9. A portable electronic device according to claim 8 further comprising:
a radio frequency system in the package;
the processor being further configured to interface with a server using the radio frequency system, to provision, deactivate, renew and/or upgrade the predetermined card.

10. A portable electronic device according to claim 9 wherein the processor is further configured to receive a file comprising the representation of the predetermined card from the server, the file also including an account code and/or an authentication key.

11. A portable electronic device according to claim 9 in further combination with the server.

12. A portable electronic device according to claim 8 wherein the processor is further configured to prevent use of the predetermined card, prevent predetermined display content and/or prevent execution of at least one predetermined application, in response to instructions.

13. A portable electronic device according to claim 8 wherein the processor is further configured to control information exchange in response to user selection of the predetermined card via the user input device.

14. A portable electronic device according to claim 8 wherein the predetermined card comprises a credit card, a debit card, a club card and/or a personal membership card.

15. A portable electronic device comprising:
a unitary package including first and second opposing faces;
a first flat panel display on the first face;
a second flat panel display on the second face;
a user input device and a dynamic magnetic encoder on the unitary package;
a processor in the unitary package that is configured to control the first and second flat panel displays and that is responsive to the user input device; and
a biometric reader on the unitary package, and wherein the processor is configured to display a representation of a predetermined card on the first flat panel display and to control the dynamic magnetic encoder to provide magnetic stripe information for the predetermined card, in response to user selection of the predetermined card via the user input device, and verification of a user identity via the biometric reader.

16. A portable electronic device according to claim 15 further comprising a radio frequency identification (RFID) reader, an RFID transmitter, a short range wireless transceiver, a cellular transceiver, a bar code display, a location system and/or an electrical contact in and/or on the unitary package.

17. A portable electronic device comprising:
a unitary package including first and second opposing faces;
a first flat panel display on the first face;
a second flat panel display on the second face;
a user input device on the unitary package;
a processor in the unitary package that is configured to control the first and second flat panel displays and that is responsive to the user input device, wherein the processor is configured to display a substantially full size image of a front of a predetermined card on the first flat panel display, in response to user selection of the predetermined card via the user input device; and
a radio frequency system in the package;
the processor being further configured to interface with a server using the radio frequency system, to provision, deactivate, renew and/or upgrade the predetermined card.

18. A portable electronic device according to claim 17 wherein the processor is further configured to receive a file comprising the representation of the predetermined card from the server, the file also including an account code and/or an authentication key.

19. A portable electronic device according to claim 18 in further combination with the server.

20. A portable electronic device according to claim 17 wherein the processor is further configured to prevent use of the predetermined card, prevent predetermined display content and/or prevent execution of at least one predetermined application, in response to instructions.

21. A portable electronic device according to claim 17 wherein the predetermined card comprises a credit card, a debit card, a club card and/or a personal membership card.

* * * * *